United States Patent [19]

Dick

[11] 4,227,427
[45] Oct. 14, 1980

[54] DRIVE UNIT ASSEMBLY

[75] Inventor: Wesley M. Dick, Fort Wayne, Ind.

[73] Assignee: Dana Corporation, Toledo, Ohio

[21] Appl. No.: 831,588

[22] Filed: Sep. 8, 1977

[51] Int. Cl.³ .................... F16H 57/04; F01M 1/00
[52] U.S. Cl. ................................ 74/467; 74/710; 184/6.12
[58] Field of Search .................... 74/710, 467, 695; 184/6.12, 13 R, 11 R; 308/187, 101, 107, 118, 122

[56] References Cited

U.S. PATENT DOCUMENTS

| | | | |
|---|---|---|---|
| 1,631,217 | 6/1927 | Matthews | 184/13 X |
| 2,135,477 | 11/1938 | Griswold | 184/6.12 |
| 2,147,145 | 2/1939 | Carlson et al. | 184/11 |
| 2,178,900 | 11/1939 | Starr | 184/11 |
| 2,618,359 | 11/1952 | Alden | 184/11 |
| 2,930,448 | 3/1960 | Burnham | 184/11 R |
| 3,214,989 | 11/1965 | Wallauer et al. | 184/6.12 X |
| 3,413,873 | 12/1968 | Bixby | 74/695 |
| 4,095,675 | 6/1978 | Bell | 74/695 X |

Primary Examiner—C. J. Husar
Assistant Examiner—Frank McKenzie
Attorney, Agent, or Firm—Robert M. Leonardi

[57] ABSTRACT

A two speed differential axle is disclosed having a lubricant containing housing which encloses engageable differential and planetary gear assemblies. An input shaft extends into the housing and has a pinion gear rigidly affixed to an inner portion thereof. The pinion gear is adapted to drive the differential and planetary gear assemblies. Two pinion bearing assemblies are positioned within a bore in the housing through which the input shaft extends. The pinion bearings operatively support the rotatable input shaft. A generally flat and annular baffle is rigidly affixed to the inner portion of the input shaft between the pinion bearings and the pinion gear. The baffle, the innermost pinion bearing, and a portion of the housing define a lubricant pump chamber for pressurizing and pumping lubricant. The housing further comprises a lubricant passageway having an inlet in communication with the lubricant pump chamber and positioned between the pinion bearings and the baffle, and an outlet adjacent the differential gear assembly. Means are provided for circulating lubricant from the differential gears to an area adjacent the pinion bearings, which are adapted for pumping the lubricant into the lubricant pump chamber and against the rotatable baffle. In operation the rotating baffle creates a lubricant pressure head within the lubricant pump chamber and at the inlet of the lubricant passageway which induces rapid circulation of lubricant through the housing.

8 Claims, 4 Drawing Figures

DRIVE UNIT ASSEMBLY

BACKGROUND OF THE INVENTION

This invention relates generally to drive units and more particularly to lubricant circulation within such drive units.

Many vehicles presently being manufactured, such as passenger cars and trucks, have a forward mounted engine with an associated drive train extending from the engine to the rear axle. The rear axle traditionally is equipped with a drive unit such as a differential gear assembly which is adapted to transmit power from the drive shaft to the rear axles. Several other types of drive units for transmitting power are well known in the art and are widely used in industrial applications other than in vehicles.

Problems have arisen in some heavy duty drive unit applications such as, for example, heavy duty trucks. Most heavy duty trucks presently being manufactured are adapted to be driven through a rear axle differential gear. Many of these trucks are equipped with two speed axle gearing assemblies. A common type of two speed axle assembly includes a planetary gear set which is selectively engageable with the differential gear assembly. Increasing speed and load carrying capabilities of modern vehicles have increased the stresses to which axle drive units are exposed and have created some serious lubrication problems. An adequate lubricant flow over the drive unit components lubricates and helps dissipate heat which builds up within the assembly. For example, lubricant flowing rapidly across the bearings or gears can absorb heat there from and transfer it to the housing, which often has fins or other heat dissipating devices rendering it more capable of such heat dissipation.

With the ever increasing size of drive units used in industrial and vehicle applications, as for example the aforementioned two speed heavy duty truck axle having both differential and planetary gear assemblies, adequate lubricant circulation becomes increasingly difficult. Attempts have been made to provide drive units such as these with lubricant recirculation systems. Many of these systems are designed to scoop oil or other lubricant from a reservoir within the drive unit housing and randomly distribute it through the gearing assembly. However, none of the previously known systems has proved to be entirely adequate.

Centrifugal force exerted upon the lubricant by the rotating gears has caused a major problem in previously known lubrication systems. It should be noted that typical truck axle assemblies are operative generally in the 2800 to 3200 r.p.m. range. Many previously known lubrication systems do not properly direct lubricant to the bearing and gear assemblies of the drive units. As a result, centrifugal force can carry lubricant to the outer portions of the lubricant enclosure without ever having performed its intended lubricating and heat dissipating function. These lubricant "spin-out" problems may result in a welding together of the non-lubricated drive unit components.

SUMMARY OF THE INVENTION

It is therefore an object of the present invention to provide a drive unit having a lubrication system adapted to pump lubricant to its critical components.

This and other objects of the present invention which will become apparent from the following detailed description are achieved by a drive unit comprising a housing for containing a lubricant and a gear assembly positioned within the housing. The housing comprises an opening through which extends a rotatable input shaft. A gear, such as a pinion gear, may be rigidly affixed to an inwardly extending portion of the input shaft. An annular and rotatable baffle is rigidly affixed to the inner portion of the input shaft axially inwardly of the input shaft opening. The input shaft is rotatably supported by a bearing assembly which is adapted to pump lubricant against the baffle. An annular lubricant pump chamber is defined by the baffle, bearing assembly and a portion of the housing. The drive unit housing is provided with a lubricant passageway having an inlet exposed to the lubricant pump chamber and positioned between the bearing assembly and the baffle, and an outlet adjacent the gear assembly. The rotating baffle is adapted to create a lubricant pressure head within the lubricant pump chamber which forces lubricant through the lubricant passageway into critical areas of the drive unit.

DETAILED DESCRIPTION OF A PRESENTLY PREFERRED EMBODIMENT

Figure 1:
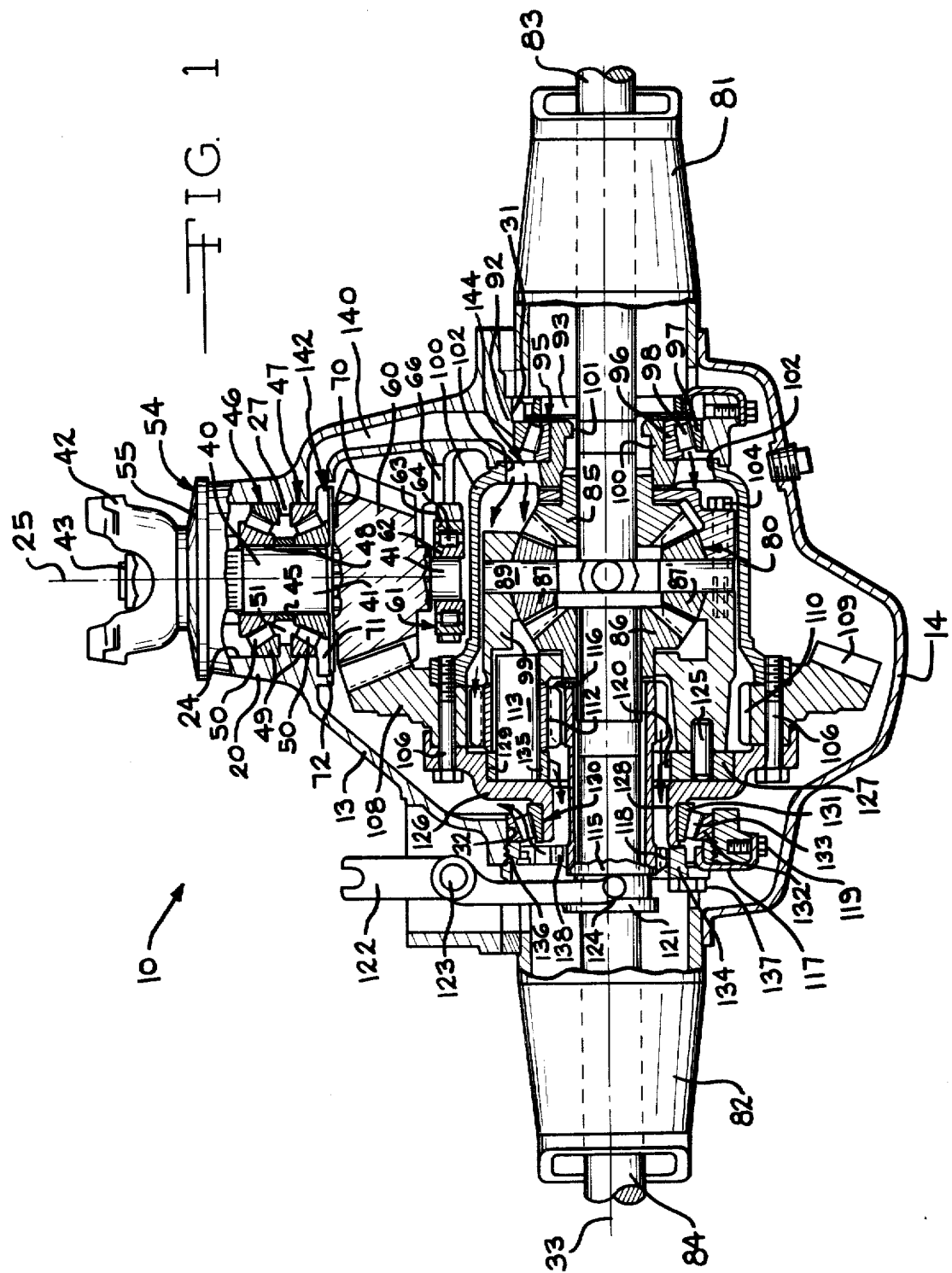
FIG. 1 is a cross-sectional top view of a drive unit utilizing a lubricant recirculation system of the present invention.
Figure 2:
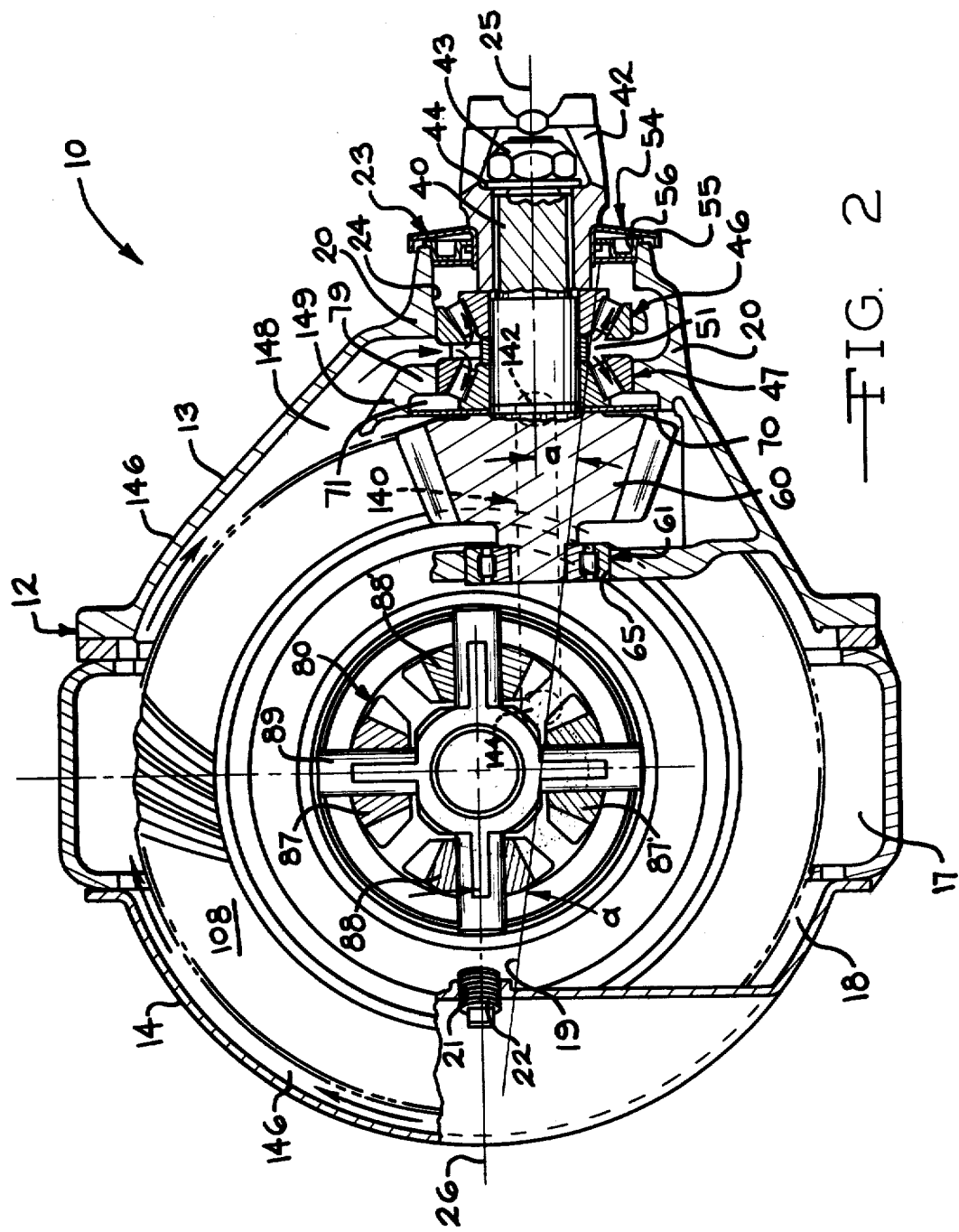
FIG. 2 is a cross-sectional side elevation view of the drive unit of FIG. 1.

A two speed drive unit 10 for use in a heavy duty truck axle is shown in FIGS. 1 and 2. The drive unit 10 comprises a housing 12 having a front portion or carrier 13 and a rear portion or banjo 14. The front and rear housing portions 13 and 14 are joined, such as by bolts (not shown), whereby a reservoir 17 is created for containing a body of lubricant 18. As is most clearly seen in FIG. 2, the free standing lubricant level 19 is generally below the midplane 26 of the unit 10. It should be noted that the midplane 26 is at an angle "a" to the free standing lubricant, indicating that the unit 12 is tilted relative to the horizontal. In vehicles, the angle "a" can vary from about $-10°$ to about $20°$ depending upon the angle at which the driveline (i.e. driveshaft) extends. The angle "a" is about $4°$ in the disclosed drive unit 10.

The front housing portion 13 includes a boss 20 through which extends a bore 24 having an axis 25 and defining an input opening 23. It can be seen that the bore 24 also extends at an angle "a" to the free-standing lubricant level 19. The boss 20 also comprises an annular and generally axially extending ridge 72 concentric with the bore 24. Referring to FIG. 1, the bore 24 defines an annular ridge 27 concentric with the bore 24 and adapted for supporting bearing assemblies as will hereinafter be described. The rear housing portion 14 includes two concentric side output bores 31 and 32 having an axis 33. Each of the bores 31 and 32 are radially stepping to readily accept bearings etc. inserted therein. The rear housing portion 14 further comprises a threaded oil port 21 into which is screwed a removable oil plug 22.

An input shaft 40, having a generally longitudinal axis 25 about which it is rotatable, extends through the input opening 23 into the bore 24. A yoke 42 is rigidly affixed to an axially outer portion of the input shaft 40 by means of a lock washer 44 and a nut 43. The input shaft 40 includes an axially inner portion 41 extending into the housing 12. A drive pinion gear 60 is rigidly affixed to the axially inner portion 41 of the input shaft and is rotatable about the axis 25.

An inner pinion bearing assembly 47 and an outer pinion bearing assembly 46 are positioned within the bore 24 on opposite sides of the ridge 27 for rotatably supporting the input shaft 40. A lubricant collection area 51 exists between the bearing assemblies 46 and 47 for lubrication purposes as will hereinafter be described. The pinion bearing assemblies 46 and 47 each comprise an inner race 48 rotatable with the input shaft 40 and an outer race 49 rigidly affixed to the surface of the bore 24 and abuttingly associated with the ridge 27. The bearing assemblies 46 and 47 each include a plurality of circumferentially spaced tapered roller bearings 50, each set of roller bearings being tapered toward the other bearing assembly (i.e., the smallest diameter portion of each bearing is exposed to the collection area 51 between the bearing assemblies 46 and 47). The outer pinion bearing assembly 46 is secured within the bore 24 by the yoke 42 which abuts the outer bearing assembly inner race 48 and is rotatable therewith. The inner bearing assembly 47 ultimately is held in position by the drive pinion gear 60.

The drive unit 10 is protected from dirt or debris entering through the input opening 23 by means of a stone guard assembly 54 extending between the yoke 42 and the front housing boss 20. The stone guard assembly 54 comprises an annular cap 55 rigidly affixed to the rotatable yoke 42. An annular seal 56 is secured within the input opening 23 for rotational sliding engagement with the cap 55.

The axially innermost portion of the input shaft is rotatably secured within the housing 12 by a nose bearing assembly 61. The bearing assembly 61 is secured within a bore 65 in an inwardly projecting extension 66 of the housing 13. The bearing assembly 61 includes an outer race 63 fitted into the bore 65, an inner race 62 operatively affixed to the innermost end of the rotatable input shaft 40, and a set of circumferentially spaced roller bearings 64. Nose bearing assemblies such as 61 are required in some heavy duty truck axle assemblies, such as those utilizing the two speed drive units, to maintain proper driving contact between the gear teeth of the drive pinion 60 and an associated ring gear.

Figure 3:
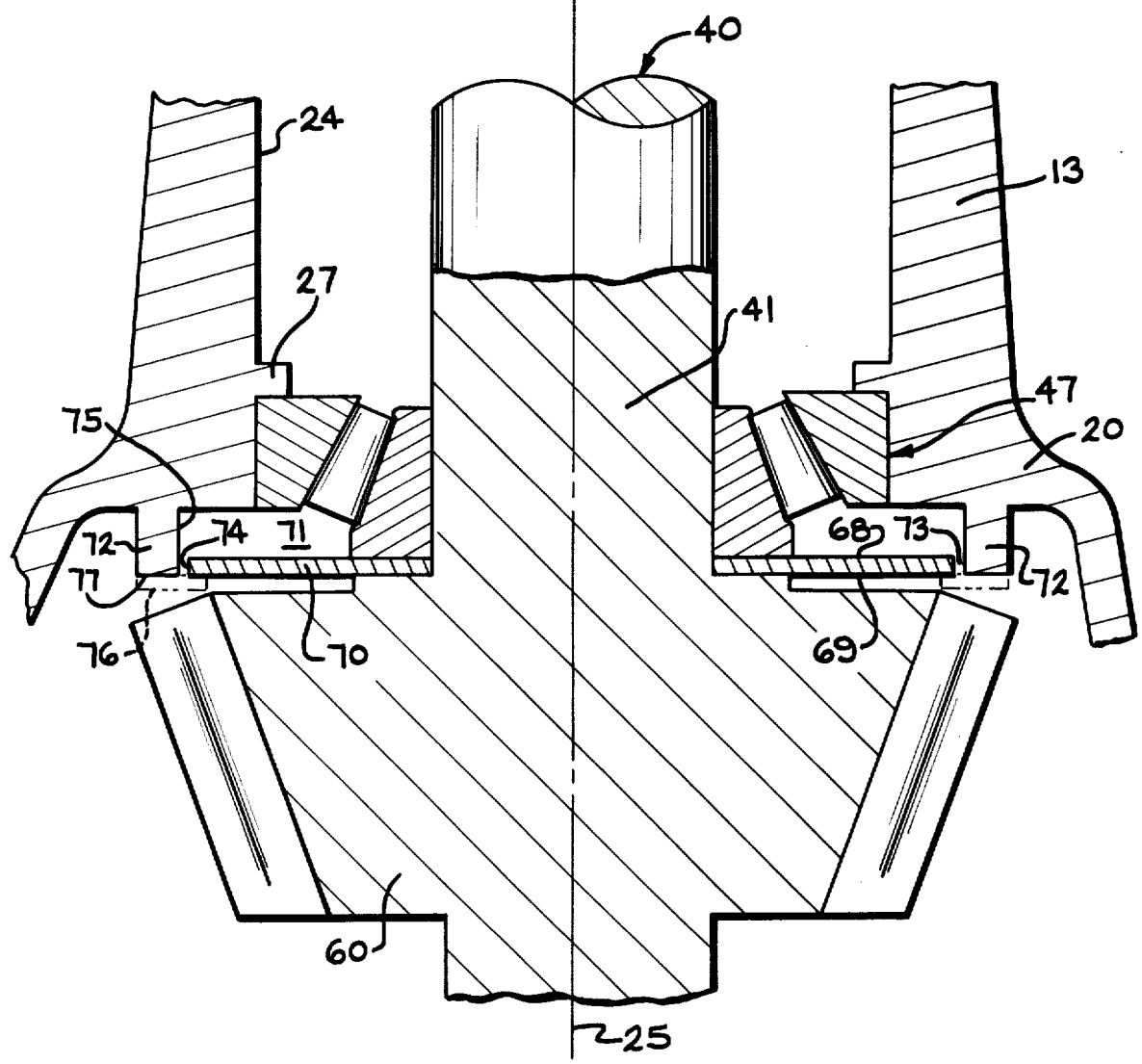
FIG. 3 is a cross-sectional view of a portion of the drive unit of FIGS. 1 and 2 having a modification shown in phantom.

As is most clearly seen in FIG. 3, an annular metal baffle 70 is rigidly affixed to the axially inner portion 41 of the rotatable input shaft 40. The baffle 70 has an inside diameter approximately equal to the diameter of the input shaft 40. The baffle 70 is generally flat, having two parallel and radially extending faces 68 and 69 and an annular radially outer surface 74. In the presently preferred embodiment, the baffle 70, which can be produced in a stamping operation, has a thickness of about 0.060 inches (0.152 cm.). The baffle 70 axially abuts the drive pinion gear 60 and is designed to act as a pinion gear spacer for positioning the pinion gear relative to the ring gear. The thickness of the baffle may therefore be varied as required and additional spacers may be added if necessary.

The outside diameter of the baffle 70 is smaller than the inside diameter of the ridge 72 such that the annular baffle surface 74 does not rub against the radially inner annular surface 75 of the ridge 72. An annular gap 73 between the baffle 70 and the ridge 72 exists because of the manufacturing tolerances required to press fit the baffle 70 over the inner portion 41 of the input shaft 40. In the presently preferred embodiment, the gap 73 has a maximum width of about 0.125 inches (3.175 mm.). An annular lubricant pressurization and pump chamber 71 is formed between the ridge 72, the flat surface 68 of the baffle 70 and the inner pinion bearing assembly 47. Operation of the baffle 70 will be more thoroughly described hereinafter.

Referring again to FIG. 1, the differential gear assembly 80 is positioned within the drive unit housing 12. Extending in opposite directions from the differential assembly 80 are a right output shaft 83 and a left output shaft 84. The output shafts 83 and 84 are rotatable within the shaft housings 81 and 82, respectively, which extend from within the side output openings 31 and 32, respectively, and are affixed thereto by means such as welding or bolting. Differential gears 85 and 86 are rigidly affixed to the inwardly extending portions of each shaft 83 and 84, respectively. Each side gear 85 and 86 is drivingly engaged with four differential bevel gears 87, 87', 88 and 88' (see FIG. 2) which are rotatably supported at the ends of a differential cross 89. The differential shaft 89 extends into bores in a differential case 99 and is thereby adapted to be rotatably driven about the axis 33 in response to rotation of the differential case 99 as will hereinafter be described.

A gear support casing 100 surrounds the differential gear assembly 80 and is rotatable around the axis 33. The casing 100 defines an axially extending bore 101 through which the right output shaft 83 extends. A plurality of equally circumferentially spaced lubricant bores 102 defined in the casing 100 equally radially spaced from the axis 33 and are rotatable thereabout.

The housing 12 includes an annular projection 92 extending inwardly from a location adjacent the right output opening 31. A right output bearing assembly 93 is operatively affixed within the right output bore 31 and in contact with the projection 92. The bearing assembly 95 is secured by a bearing retainer 93 which is also positioned within the bore 31. The bearing assembly 95 includes an outer race 97 affixed to the drive unit housing 12, an inner race 96 affixed to and rotatable with a portion of the casing 100, and a set of circumferentially spaced roller bearings 98 tapered generally outwardly from the differential gear assembly 80, i.e., having the larger diameter end portions nearest the differential gear assembly 80.

The casing 100 is rigidly affixed to a rotatable ring gear 108 by means of bolts 106. The ring gear 108 includes a plurality of teeth 109 which are in driving engagement with the drive pinion gear 60. A radially inner portion of the ring gear 108 includes another set of gear teeth 110 which forms the ring of the planetary unit.

Four planetary pinion gears 112 rotatable about pins 113 are drivingly engaged with the gear teeth 110 of the ring gear. Each pin 113 is drivingly rotatably engaged with the drive case 99 and the ring gear, as will be described herein. The planetary pinions 112 are also in driving engagement with a sun gear 116 integrally formed in a shift sleeve 115. The shift sleeve 115 further includes integrally formed sliding clutch gear teeth 118 adapted for engaging and disengaging the planetary assembly.

As viewed in FIG. 1, the leftward end of the shift sleeve 115 includes a shift collar 121. A shift fork 122 is pivotably mounted on a lever pin 123 which is rigidly secured to a fixed portion of the drive unit housing 12. A portion of the shift fork 122 extends downwardly from the pin 123 and drivingly engages a shift collar pin 124 passing through the shift collar 121. The shift fork 122 is adapted to be pivoted about the pin 123 to axially drive the shift sleeve 115 along the axis 33.

A back plate 126 is rigidly secured to the ring gear 108 by the bolts 106. The back plate 126 defines an axially extending bore 128 through which the left axle shaft 84 extends. The back plate 126 further includes a cavity 129 into which is fitted a planetary pin support plate 127. Four pins 125 secure the support plate 127 to the rotatable differential case 99. The plate 127 includes four bores 135 for drivingly accepting the planetary pins 113. High speed clutch teeth 120 for engagement with the sun gear teeth 116 are disposed on a radially inner surface of the pin support plate 127.

A left output bearing assembly 130 is positioned between a portion of the back plate 126 and the bore 32. Bearing assembly 130 includes an outer race 132 rigidly affixed to the bore 32, an inner race 131 affixed to the back plate 126, and a plurality of roller bearings 133 tapering outwardly from the differential gear assembly 80 (leftwardly in FIG. 1). A sleeve lock plate 136 is threaded into the bore 32 in the housing portion 13 to secure the bearing assembly 130. A C-shaped retaining clip 117 extends into holes in the plate 136 and thereby keeps the clip from unthreading. A bolt 119 retains the clip 117. A locking member 134 is bolted to the housing 12 by bolts 137. The radially inner surface of the locking member 134 includes integrally formed lock gear teeth 138 engageable with the sleeve gears 118 as will hereinafter be described.

The shift sleeve 115 is in its extreme rightward position (as seen in FIG. 1) when the drive unit 10 is being driven through its low speed gearing arrangement. In the low range the gears 118 and 138 are engaged whereby the shift sleeve 115 is held stationary. The shift sleeve planetary pinion gears 116 are, as always, in driving engagement with the planetary pinions 112. Power is therefore transmitted from the input shaft 40 to the drive pinion 60, the ring gear 108, and the planet gears 112. As the ring gear rotates, the planetary pinions 112 rotate about the shift sleeve 115 and rotatably drive the differential case 99 and thus the differential gear assembly 80. The differential gear assembly 80 drives the output shafts 83 and 84 and compensates for any differential rotation of the associated wheels.

When a higher speed range is required, the shifter sleeve 115 is moved to its extreme leftward position (as viewed in FIG. 1) by the shift fork 122. In this position the shift sleeve gear 118 is disengaged from the gear 138, thereby permitting rotation of the shift sleeve 115. Furthermore, the sun gear 116 is engaged with the clutch 120. Rotation of the ring gear 108 therefore drivingly rotates the shift sleeve 115 by the sun gear 116. It should be noted that the sun gear 116 in the second position remains drivingly engaged with the planetary pinions 112. A higher rate or rotation of the differential gear assembly 80 therefore results.

Referring to FIGS. 1 and 2 a lubricant passageway 140 integrally formed within the front housing portion 13 extends generally between the input shaft 40 and the differential gear assembly 80. The passageway 140 has a generally rectangular cross section with an average depth of about 0.5 inches (1.27 cm.), as seen in FIG. 1, and an average width of about 1.25 inches (3.175 cm.), as seen in FIG. 2. The average cross sectional area of the passageway 140 is therefore about 0.625 square inches (4.03 square cm.). However, it should be noted that lubricant passageways such as 140 may have different cross sectional configurations with areas varying from about 0.25 to about 1.5 square inches (0.635 to 3.81 square cm.) or more, depending upon the particular drive unit. As can be seen in FIG. 2 the passageway 140 is parallel to the input shaft axis 25 and is positioned generally above the free standing lubricant level 19. Therefore, although gravity assists in transporting lubricant through the passageway 140 in the presently preferred embodiment, pumping is required to raise the lubricant to the level of the passageway and to rapidly circulate lubricant through the passageway.

The passageway 140 includes an inlet 142 axially positioned generally between the baffle 70 and the inner roller bearing assembly 47. The passageway 140 also includes an outlet 144 adjacent the differential gear assembly 80. The outlet 144 is also adjacent to the right output bearing assembly 95 and the bores 102 in the casing 100.

The housing portions 13 and 14 are provided with a continuously circumferentially extending lubricant return path 146 positioned radially outwardly from the ring gear 108. The lubricant return path 146 extends from the lubricant reservoir 17 within the rear housing portion 14 approximately 270° about the housing 12 to the lubricant collection area 51 between the bearing assemblies 46 and 47. A lubricant deflection lip 149 is positioned within the return path 146 adjacent the bearing assemblies 46 and 47. The deflection lip 149 together with the housing 13 form a lubricant return channel 148 which extends to the lubricant collection area 51. The lubricant return channel 148 in the presently preferred embodiment has a generally rectangular cross section having dimensions of about 1 by 2.25 inches (2.54 by 5.715 cm.) at its widest point and about 0.375 by 1.5 inches (0.9525 by 3.81 cm.) at its narrowest point immediately adjacent the collection area 51.

As viewed in FIG. 2, the ring gear 108 is adapted to rotate clockwise when the associated vehicle is moving forward. In operation, the ring gear teeth 109 are rotated into the reservoir 17, drawing lubricant therefrom and casting it upwardly and outwardly against the housing 12. Centrifugal force exerted on the lubricant guides it into the lubricant return path 146. Lubricant is also forced circumferentially within the path 146 in the direction of rotation of the ring gear 108. Arrows within the lubricant return area 146 as seen in FIG. 2 indicate the direction of lubricant flow when the ring gear 108 is rotated in the clockwise or forward direction. As the lubricant moving within the path 146 approaches the bearing assemblies 46 and 47, the deflection lip guides it into the channel 148 which then directs it into the collection area 51.

The tapered roller bearing assemblies 46 and 47 are capable of and do in fact act as pumps for the lubricant entering the bearing assemblies from the collection area 51 (i.e., adjacent the small diameter end of the roller bearings). The bearing assemblies 46 and 47 pump lubricant in the direction of arrows as shown in FIG. 2 (i.e., opposite the direction of their taper). It should be noted that while the drive unit 10 is adapted for operation in the range of 2800 to 3200 r.p.m., the tapered roller bearings 50 rotate at a much higher speed, for example about 10,000 r.p.m., thereby creating significant pumping action.

The inner pinion bearing assembly 47 pulls lubricant from the collection area 51 and directs it toward the flat annular baffle 70 which is rotating with the input shaft 40 and pinion gear 60. As lubricant emerges from the inner bearing assembly 47 it enters the annular pump chamber 71. The baffle 70 rapidly circulates lubricant within the chamber 71, thereby producing a fluid pressure head therein.

As is more clearly seen in FIG. 1 the chamber 71 opens to inlet 142 of the passageway 140. The centrifugal forces and the fluid pressure head created by the baffle force lubricant out of the chamber 71 and into the passageway 140 through the inlet 142. The fluid pressure head is maintained within the lubricant passageway 140 because of its relatively small cross sectional area. Lubricant is therefore forced through the passageway 140 to the outlet 144, through the bores 102 in the rotating casing 100, and into the differential gear assembly 80.

The tapered roller bearing assembly 95 also receives some of the lubricant emerging from the passageway 140 and pumps this lubricant toward the differential gear assembly. The fluid pressure head created within the chamber 71 by the baffle may continue to exert itself within the casing 100 adjacent the differential gears 80, thereby forcing lubricant leftwardly across the differential and planetary gears as indicated by the arrows in FIG. 1. The differential gears 87 and 88 assist in forcing the lubricant to the planetary pinions 112 and ultimately to the tapered roller bearing assembly 130, which pumps the lubricant against the ring gear back plate 126 and to the reservoir 17. The lubricant eventually reaches an area where the teeth of ring gear 108 can pick up the lubricant, thereby casting it into the lubricant return path 146 and recirculating it back to the bearing assemblies 46 and 47.

As previously noted, the outer surface 74 of the baffle 70 rotates adjacent the ridge surface 75 to prevent excessive lubricant leakage through the gap 73. Some leakage is usually desirable for the lubrication of the drive pinion gear 60 and the nose bearing assembly 61. However, in some applications, such a gap may cause excessive leakage of lubricant, thereby decreasing the lubricant pressure head within the pump chamber 71 and the pumping capabilities of baffle 70. Therefore, in some situations it may be required to decrease the effect of the gap 73 either by more closely fitting the baffle 70 to the annular ridge 72 or by the use of some type of gap closing device.

A gap closing device (shown in phantom in FIG. 3) in the form of an annular elastomeric seal 76 is bonded to the flat radially extending face 77 of the ridge 72. The seal 76 has an inside diameter which is less than the outside diameter of the baffle 70 and an outside diameter greater than the inside diameter of the ridge 72. In other words, the seal 76 extends the width of the gap 73. A flat radially extending face 69 of the baffle 70 is in sliding contact with the seal 76 to prevent most lubricant leakage through the gap 73.

Figure 4:
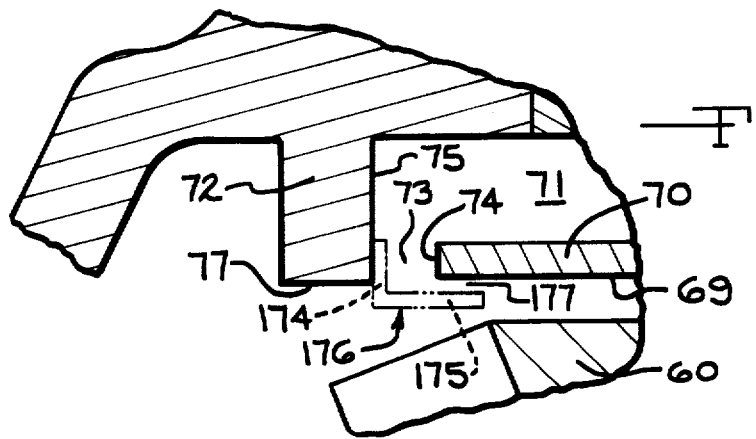
FIG. 4 is a cross-sectional view of a portion of the drive unit of FIGS. 1 and 2 having another modification shown in phantom.

Another gap closing device is shown in phantom in FIG. 4. The device comprises a metal ring 176 which is press fit against the radially inner surface 75 of the ridge 72. The ring 176 has an "L" shaped cross-section, with one leg 174 abutting the ridge 72 and the other leg 175 generally parallel to the baffle 70 and extending radially inwardly from the ridge 72. It should be noted that the leg 175 is axially spaced from the surface 69 of the baffle, a gap 177 thereby being created. The gap 177 forms part of a lubricant circulation channel which prevents lubricant leakage from the chamber 71 during operation of the drive unit.

During operation of the drive unit illustrated in FIG. 4, lubricant is rapidly circulated within chamber 71, with centrifugal forces creating the highest lubricant pressure adjacent the ridge surface 75. The leg 175 of the ring 176 retains lubricant within the chamber 71 at the location of highest lubricant pressure. Although there is no sealing contact between the ring 176 and the baffle 70, the gap 177 is radially inwardly spaced from the radially outer portion of the chamber 71 sufficiently to prevent substantial lubricant leakage. Furthermore, a seal such as 76 may be attached to the leg 175 and in sliding, sealing contact with the baffle surface 69 to prevent substantially all lubricant leakage.

It can therefore be seen that a rapid lubricant recirculation is obtained in the drive unit 10 of the present invention. The rapidly recirculating lubricant not only lubricates all of the differential and planetary gears, but also acts as a heat sink which pulls heat away from the gearing components and transfers it to the housing portions 14 and 13, where it is more easily dissipated. Extreme heating of the differential and planetary gears without lubricant can result in a lock-in or freeze-up of these gears. This problem is alleviated with the present invention.

Although the foregoing structure has been described for the purpose of illustrating a presently preferred embodiment of the invention, it should be understood that many modifications or alterations may be made without departing from the spirit and scope of the invention as set forth in the appended claims.

I claim:

1. A drive unit comprising a housing for containing a body of lubricant, said housing having a shaft opening; a gear assembly positioned within said housing; a shaft axially extending through said shaft opening and rotatable about said axis, said shaft spaced from said gear assembly; an annular baffle rigidly affixed to an axially inner portion of said shaft and positioned axially inwardly of said shaft opening, said baffle rotatable with said shaft about said axis; a bearing assembly positioned between said shaft opening and said baffle, a generally annular lubricant chamber at least partially defined by said baffle and said bearing assembly, said annular chamber being generally closed, and a lubricant passageway having an inlet in communication with said lubricant chamber and an outlet adjacent said gear assembly said inlet axially positioned between said baffle and said bearing assembly.

2. A drive unit as defined in claim 1 wherein said lubricant passageway has a generally constant cross sectional area of between about one-quarter to about one and one-half square inches (0.635 to 3.81 square cm.).

3. A drive unit as defined in claim 1 wherein the free standing level of said lubricant is generally below said lubricant passageway.

4. A drive unit as defined in claim 1 wherein said baffle is generally flat.

5. A drive unit as defined in claim 1 further comprising a second bearing assembly positioned between said shaft opening and said bearing assembly, said second bearing assembly being axially spaced from said bearing assembly wherein a lubricant collection area is formed between said bearing assembly and said second bearing assembly.

6. A drive unit as defined in claim 5 further comprising means for circulating said lubricant from said gear assembly to said lubricant collection area.

7. A drive unit as defined in claim 1 wherein said bearing assembly is adapted for pumping said lubricant against said baffle.

8. A drive unit comprising a housing for containing a body of lubricant, said housing having a shaft opening; a gear assembly positioned within said housing; a shaft axially extending through said shaft opening and rotatable about said axis, said shaft spaced from said gear assembly; an annular baffle rigidly affixed to an axially inner portion of said shaft and positioned axially inwardly of said shaft opening, said baffle rotatable with said shaft about said axis; a bearing assembly positioned between said shaft opening and said baffle, a generally annular lubricant chamber at least partially defined by said baffle and said bearing assembly, a lubricant passageway having an inlet in communication with said lubricant chamber and an outlet adjacent said gear assembly, said lubricant chamber having an annular gap adjacent the radially outer periphery of said baffle, and means for bridging said gap.

* * * * *